United States Patent

Hall et al.

[15] 3,697,585
[45] Oct. 10, 1972

[54] POLYSUBSTITUTED DIHYDROPYRENES

[72] Inventors: Luther A. R. Hall, Woodcliff Lake, N.J.; John A. Gurney, Tarrytown, N.Y.; Harris B. Renfroe, Montvale, N.J.

[73] Assignee: Ciba-Geigy Corporation, Ardsley, N.Y.

[22] Filed: Oct. 16, 1970

[21] Appl. No.: 81,607

Related U.S. Application Data

[60] Division of Ser. No. 635,287, April 7, 1967, Pat. No. 3,557,218, which is a continuation-in-part of Ser. No. 499,064, Oct. 20, 1965, abandoned.

[52] U.S. Cl. ............ 260/488 B, 96/117, 161/192, 252/300, 260/141, 260/396 N, 260/439 R, 260/464, 260/486 R, 260/561 R, 260/566 A, 260/586 H, 260/591, 260/598, 260/612 D, 260/613 R

[51] Int. Cl. .................... C07c 69/14, C07c 69/16

[58] Field of Search ...................... 260/488 B

[56] References Cited

OTHER PUBLICATIONS

Chem. Abstracts, 42:4998f
Chem. Abstracts, 52:18351e

*Primary Examiner*—Vivian Garner
*Attorney*—Karl F. Jorda et al.

[57] ABSTRACT

Photochromic 1,3,6,8-tetra(lower)alkyl-15,16-dimethyl-15,16-dihydropyrenes, 15,16-methylene-15,16-dihydropyrenes, 15,16-methylene-15,16-dihydropyrenes and 1,3,6,8-tetra(lower)alkyl-15,16-methylene-15,16-dihydropyrenes substituted in one or both of the 2- and 7-positions benzoyl, alkanoyl, alkanoyloxy, cyano, nitro, alkyl, α-hydroxy-alkyl, α-acyloxyalkyl, α-isonitrosoalkyl, or acylamido groups are prepared via substitution of the parent hydrocarbon. A typical embodiment is 2-acetamido-7-nitro-1,3,6,8,15,16-hexamethyl-15,16-dihydropyrene.

2 Claims, No Drawings

POLYSUBSTITUTED DIHYDROPYRENES

CROSS REFERENCE

This is a division of copending application Ser. No. 635,287, filed Apr. 7, 1967, now U.S. Pat. No. 3,557,218, which in turn is a continuation-in-part of application Ser. No. 499,064, filed Oct. 20, 1965, now abandoned.

DETAILED DESCRIPTION

This invention relates to organic compounds reversibly convertible from colored to colorless isomeric forms.

More particularly, this invention pertains to 15,16-dihydropyrenes, which are photochromic. Thus these compounds when exposed to light become colored or colorless depending on their structure, and, when withdrawn from light revert to their original state. These compounds accordingly find application as self-attenuating light valves in articles such as tinted safety glass and headlights for automobiles; infra-red screens, solarium windows, display windows, and automatic curtains; in information retrieval apparatus such as computer memory core devices, toys, photocopying devices, light meters, and the like.

The fundamental pyrene nucleus of the compounds of the present invention is numbered as follows:

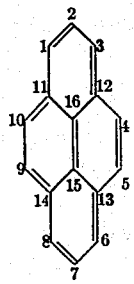

The compounds of the present invention are represented by the following formulas:

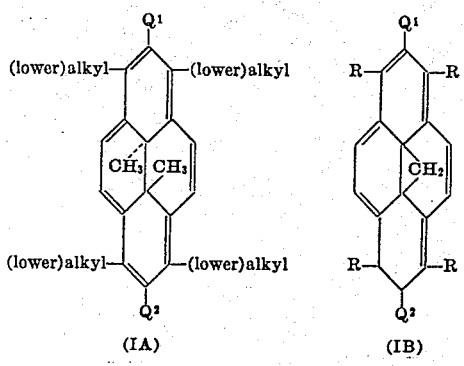

wherein R is hydrogen or (lower)alkyl;

$Q^1$ is benzoyl, (lower)alkanoyl, (lower)alkanoyloxy, cyano, nitro, α-isonitroso(lower)alkyl, α-hydroxy(lower)-alkyl, α-(lower)alkanoyloxy(lower)alkyl, α-(lower)alkenoyloxy-(lower)alkyl, or (lower)alkanoylamido, and $Q^2$ is hydrogen, benzoyl, (lower)alkanoyl, (lower)alkanoyloxy, cyano, nitro, α-isonitroso(lower)alkyl, α-hydroxy-(lower)alkyl, α-(lower)alkanoyloxy(lower)alkyl, α-(lower)alkenoyloxy(lower)alkyl, or (lower)alkanoylamido.

By the term "alkyl", and derivations thereof employing the root "alk", is meant a branched or straight chained saturated hydrocarbon chain of up to about 30 carbon atoms, or a group containing such a chain. Representative of such alkyl groups are thus methyl, ethyl, propyl, isopropyl, butyl, s-butyl, t-butyl, pentyl, hexyl, octyl, decyl, dodecyl, tetradecyl, hexadecyl, octadecyl, eicosyl, docosyl, tetracosyl, hexacosyl, octacosyl, triacontyl and the like. It is to be understood that when required by the nature of certain functional groups, as for example, unsaturation in alkenyl, such groups will contain at least two carbon atoms. When the term alkyl is qualified by the designation "lower", there is included branched or straight chain hydrocarbon groups of from one to about six carbon atoms.

The compounds of the present invention are prepared via mono or disubstitution in one or more steps as hereafter described of a trans-15,16-dimethyl-1,3,6,8-tetra(lower)alkyl-15,16-dihydropyrene or a cis-15,16-methylene-15,16-dihydropyrene, the latter nucleus being optionally tetrasubstituted by (lower)alkyl groups in the 1, 3, 6 and 8-positions. Introduction of one or more acyl groups such as benzoyl, acetyl, propionoyl, butanoyl and the like is effected through treatment with the corresponding acid chloride or acid anhydride in the presence of stannic chloride, optionally in an inert, non-aqueous solvent such as methylene chloride, chloroform or the like. Thus for example the benzoyl group is introduced through treatment with benzoyl chloride and stannic chloride while the acetyl, or other alkanoyl, group is introduced through treatment with acetic anhydride, or other alkanoic acid anhydrides, and stannic chloride. In the case of the formyl, there is preferably employed butyl dichloromethyl ether, and stannic chloride. The butyl dichloromethyl ether may be obtained for example from n-butyl formate and phosphorus pentachloride.

Compounds wherein one or both of $Q^1$ and $Q^2$ are α-isonitrosoalkyl are obtained through the reaction of the corresponding alkanoyl compounds and hydroxylamine. Treatment of the oxime obtained from the formyl starting material with acetic anhydride yields the corresponding cyano compound.

The compounds of the present invention bearing a nitro group in the 2 or 7-position are obtained through nitration, utilizing cupric nitrate and acetic anhydride. Reduction of the resulting nitro compound with zinc dust and acetic acid/acetic anhydride yields the corresponding acetamido derivative (or with zinc and other alkanoic acid anhydrides to yield the corresponding alkanoylamido derivatives).

Reduction of the various alkanoyl derivatives of the present invention as with lithium aluminum hydride and aluminum chloride yields the corresponding alkyl derivatives. Selective reduction of the alkanoyl derivatives as with lithium aluminum hydride yields the α-hydroxyalkyl derivative which may be optionally acylated as with acetic anhydride, acrylic anhydride or other acid anhydrides.

Preparation of alkanoyloxy derivatives is best accomplished from the intermediate 2,7-dione through the action of zinc and an alkanoic acid anhydride such as acetic anhydride.

The requisite starting materials for the present invention may be prepared by procedures described in copending application Ser. No. 499,037, now U.S. Pat. No. 3,390,192 of others. Briefly in the case of the 15,16-dimethyl-1,3,6,8-tetra(lower)alkyl-15,16-dihydropyrene, this involves initial preparation of a 2,6-di(lower)alkyl-3,5-bis(chloromethyl)-4-methylanisole, such as for example 4,6-bis(chloromethyl)-2-methoxymesitylene, alternatively named as 2,4,6-trimethyl-3,5-bis-(chloromethyl)anisole. This generally comprises treating a readily available or easily prepared 2,6-di(lower)alkyl-4-methyl-phenol with a methylating agent, such as dimethyl sulfate, followed by introduction of chloromethyl groups into the two remaining unsubstituted positions. Replacement of the chlorine atoms by iodine atoms as through the action of sodium iodide then yields the corresponding 2,6-di(lower)alkyl-3,5-bis-(iodomethyl)-4-methylanisole, two molar equivalent amounts of which are coupled as through the action of sodium and tetraphenylethylene to yield a 8,16-dimethyl-[d2.2]metacyclophane of the formula:

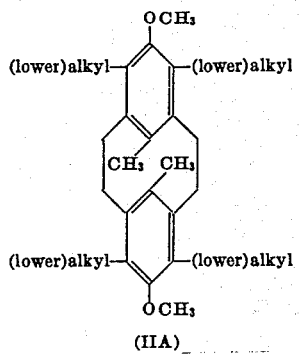

(IIA)

It has now been further discovered that elimination of several manipulative steps advantageously is possible in the foregoing conversion. Thus treatment of the above described meta-bis-(chloromethyl)benzene, intermediate such as the 2,6-di(lower)alkyl-3,5-bis-(chloromethyl)-4-methylanisole, with sodium and tetraphenylethylene yields the foregoing [2.2]metacyclophane directly.

The corresponding 8,16-methylene-[2.2]metacyclophane is obtained via acidic condensation of two molar equivalent amounts of phenol or a 2,6-di(lower)alkylphenol with formaldehyde to yield a bis-(hydroxyphenyl)methane. After methylation as with dimethyl sulfate, the dimethoxy derivative is chloromethylated to a degree sufficient to introduce one chloromethyl group on each of the phenyl rings. Ring closure of bis-(chloromethyl) compound with methylmagnesium iodide followed by ferric chloride then yields a 2,6-dimethoxy-5H-dibenzo[a,d]cycloheptene. These reactions may be represented as follows:

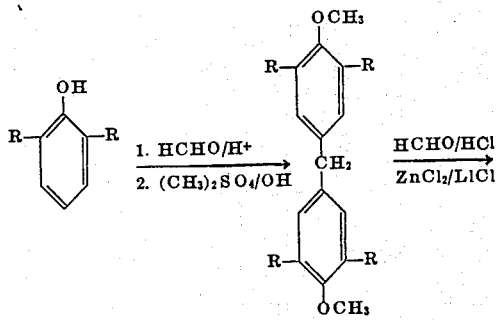

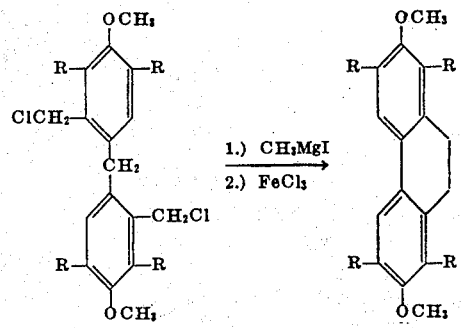

Chloromethylation in the manner described above yields the bis-(chloromethyl) compound which is converted to the tetracyclic structure with sodium and tetraphenylethylene, with methylmagnesium iodide or with zinc dust.

Alternatively the dibenzocycloheptene is monochloromethylated and the monochloromethyl product is then formylated to yield the 4-chloromethyl-6-aldehyde which is reacted with Wittig reagent such as triphenylphosphine. The resulting 4-triphenylphosphoniummethyl compound is then cyclized as with sodium ethoxide and catalytically hydrogenated as with palladium on charcoal to yield a 8,16-methylene-[2.2]metacyclophane.

Thus prepared according to the foregoing procedures is the [2.2]metacyclophane of the structure:

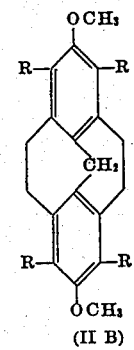

(II B)

Oxidation of the [2.2]metacyclophane of FORMULA II A or II B with ferric chloride or with chromium trioxide and sulfuric acid then yields a tetracyclic bis dienone which is oxidatively dehydrogenated with oxygen in the presence of base. Removal of the dione structure with lithium aluminum hydride and aluminum chloride followed by dehydrogenation with palladium then yields the desired 15,16-dimethyl-1,3,6,8-tetra(lower)alkyl-15,16-dihydropyrene starting material.

The following preparations and examples are given solely for the purpose of illustration and are not to be construed as limitations of this invention, many variations of which are possible without departing from the spirit or scope thereof.

PREPARATION I 1,3,6,9,15,16-Hexamethyl-15,16-dihydropyrene a. Methoxymesitylene — 2,4,6-Trimethylphenol, 29.5 g, 0.217 mol, prepared by the procedure of Hart and Beuhler, J. Org. Chem., 29, 2397 (1964), sodium hydroxide, 12.6 g, 0.316 mol, dissolved in 126 ml of water, and 19.7 ml of dimethyl sulfate, 0.217 mol, are mixed in a vessel cooled in an ice bath. The temperature is raised and maintained at 50±1° C for 1 hour, then 7.50 g of sodium hydroxide in an equal weight of water and 10 ml (0.110 mol) of dimethyl sulfate are added at 3 hour intervals during 15 hours. The product is isolated by extraction of the aqueous reaction mixture with seven 75-ml portions of ether. After washing the ether layer with 25% sodium hydroxide and evaporating the ether, the residue is fractionally distilled and 26.9 g of methoxymesitylene, b.p. 29° C/0.4 – 0.45 mm, 83% yield, is obtained.

b. Bis(chloromethyl)methoxymesitylene — A mixture of methoxymesitylene, 7.4 g, 0.049 mol, paraformaldehyde, 7.82 g, 0.197 mol, lithium chloride, 9.82 g, 0.245 mol, and zinc chloride, 4.80 g, 0.049 mol, is heated to 80° C and anhydrous hydrogen chloride is passed in. Addition of gas is continued for 5½ hours at 72 ±2° C during which time monochloromethylated product, which appears first, is converted to the desired bis chloromethylated product. The reaction misture then is poured into 100 ml of ice, and the solid material is collected on a filter and washed with water. There is obtained 11.5 g of bis(chloromethyl)methoxymesitylene, 94% of theory. Recrystallization from ethyl acetate yields 9.05 g of product, m.p. 135°–136° C.

Alternatively this product is obtained via the following procedure: To 198 g (1.32 mole) of 2-methoxymesitylene are added with stirring 1400 ml of concentrated hydrochloric acid and 78.4 g (0.87 mole) of s-trioxane (three mole equivalents formaldehyde); the resulting suspension is stirred at room temperature for 0.5 hours and a slow stream of hydrogen chloride is then passed through the stirred suspension which is warmed on a steam bath for 12 to 15 hours. The reaction slurry is then cooled and stirred in an ice bath, the crude product being collected by filtration. The collected solid is broken up and washed several times with water to remove hydrochloric acid, dissolved in methylene chloride and this solution is washed several times with a saturated sodium bicarbonate solution, followed by several washings with brine, dried, clarified with charcoal, and concentrated. The resulting solid is slurried with heptane and collected by filtration. A second washing with heptane yields the product as white needles, 234.2 g (72%), m.p. 138°–139°. The analytical sample may be prepared by recrystallization from heptane.

Anal. Calc'd for $C_{12}H_{16}OCl_2$ :C,58.31; H,6.53
Found :C,58.33; H,6.39 c. Bis(iodomethyl)methoxymesitylene — Bis(chloromethyl)methoxymesitylene, 8.0 g, 0.0324 mol, sodium iodide, 40 g, 0.26 mol, and 400 ml of tetrahydrofuran are refluxed for 6 hours. The reaction solvent is removed by distillation at 15 mm pressure. Methylene chloride, 100 ml, and 300 ml of ice water are added. The aqueous phase, after separation of methylene chloride, is extracted 4 times with 20 ml of methylene chloride. The combined organic layers are percolated through 200 ml of crushed calcium sulfate then treated with decolorizing charcoal. The methylene chloride filtrate is concentrated in a vacuum to 30 ml volume and 55 ml of methanol is added. The precipitate is collected and recrystallized first from toluene, and then from ethyl acetate to yield 9.62 g of bis(iodomethyl)methoxymesitylene, alternatively named as 2,4,6-trimethyl-3,5-bis(chloromethyl)-anisole, m.p. 134°–138° C, 69% yield.

d. 4,6,8,12,14,16-Hexamethyl-7,13-dimethoxy-[2.2]metacyclophane — Bis(iodomethyl)methoxymesitylene, 15 g in 500 ml of dry tetrahydrofuran (THF) is added at 1 drop per second to sodium sand, 20 g, 0.87 mol, suspended in 1 liter of refluxing THF and 2 g of tetraphenylethylene. The system is stirred under nitrogen with a Vibromixer stirrer. Unreacted sodium is filtered off and the THF is removed by distillation in such a way that the pot temperature remains at or below 25° C. The residual solid is dissolved in 250 ml of methylene chloride. The solution is percolated through 15 g of Florisil, then the methylene chloride is evaporated off leaving a residue, which is dissolved in 30 ml of hot carbon tetrachloride. The solid which precipitates on cooling is collected and treated with 30 ml of hot cyclohexane. The cyclohexane solution is cooled and the desired product precipitates. There is obtained 11.7 g of crude material, which is chromatographed on alkaline alumina. After rechromatographing, there is obtained 0.73 g of material, m.p. 220°–231° C.

Alternatively the [2.2]metacyclophane is prepared as follows: A 3 liter three-neck flask equipped with a Vibromixer and condenser is flame-dried while the system is purged with a stream of prepurified nitrogen and allowed to cool under a positive pressure of nitrogen. To the flask are added 200 ml of dry toluene, 20 g freshly cut sodium pieces and about 10 drops of oleic acid. The oil bath temperature is raised to 130°–140°; and, when all sodium has melted, agitation provided by the Vibromixer is carried out for 15 minutes. At the end of this time agitation is stopped, and the sodium sand allowed to cool without stirring. To this mixture is added a solution of 750 mg of tetraphenylethylene in 300 ml tetrahydrofuran (distilled from lithium aluminum hydride and stored over sodium), a deep red color forming immediately.

A 1 liter Hershberg dropping funnel is attached to the reaction vessel under the same nitrogen pressure and a solution of 30 g of 4,6-bis(chloromethyl)methoxymesitylene in 700 ml of tetrahydrofuran is added through the funnel at a rate of 20–25 drops/minute. Throughout the addition, a slow agitation is provided by the Vibromixer. Addition of the first charge is complete in 15 hours and a second charge of 30 g of the bis(chloromethyl) compound in 700 ml of tetrahydrofuran is then added over 15 hours. A few drops of ethanol are next added to destroy the red color and, after standing for several minutes to allow the unreacted sodium to settle, the milky-gray suspension is carefully decanted from most of the unreacted sodium into a large sintered-glass funnel prepared with a tight Supercel pad. The reaction flask and pad are washed with additional tetrahydrofuran and the clear, colorless filtrate was concentrated, yielding a crystalline residue. This residue is dissolved in 300 ml of methylene chloride and this solution is filtered, diluted with 300 ml ether, washed with 300 ml of 6N hydrochloric acid, dried, concentrated to a volume of 300 ml and applied to a 1.5 inch × 24 inch column of dry-packed Florisil absorbent (60–200 mesh). Of six 300 ml. fractions collected, fractions 2, 3, and 4 are combined and recrystallized twice from ethanol/heptane to yield the product as clear, colorless prisms, m.p. 234°–235°.

Anal. Calc'd for $C_{24}H_{32}O_2$:     C, 81.77;   H, 9.15
                           Found: C, 81.71;   H, 8.89 e. Bis dienone — The product of Step (d) is treated with ferric chloride. A solution of 1.00 g of the metacyclophane in 100 ml of dry chloroform is stirred at room temperature for three hours with 3.5 g ferric chloride. A precipitate of a reddish-brown inorganic complex of the bisdienone is formed and this is collected by filtration. This solid is immediately suspended in 100 ml chloroform and 20 ml 3 N hydrochloric acid. This suspension is shaken until solution occurs; the chloroform layer is separated, washed with water and concentrated. The reddish brown solid, about 1.2 g, is treated with charcoal in boiling ethanol, filtered, and the ethanolic solution is concentrated to about 20 ml. From the cold solution separates 0.9–1.0 g of a yellow solid.

Alternatively this product is prepared as follows: A chromic acid solution is prepared by treating 8.0 g of chromium trioxide with 3 to 4 ml of water followed by 6.4 ml of sulfuric acid, and dilution with water to a total volume of 30 ml. Fifteen milliliters of this chromic acid solution are added dropwise to a stirred suspension of 6.7 g, (0.019 mole) of 4,6,8,12,14,16-hexamethyl-5,13-dimethoxy-[2.2]metacyclophane in 500 ml of acetone over 15 to 20 minutes. Near completion of the addition, a green pasty precipitate forms which adheres to the side of the flask and stirrer blade. This suspension is stirred for 1.5 hours, during which time the precipitate becomes more solid and begins to break up. This mixture is poured into 1 liter of water and stirred with 500 ml of methylene chloride; the light yellow organic layer is separated from the green aqueous layer, which is extracted with an additional 150 ml methylene chloride. The combined extracts yields a crystalline light yellow residue which is washed with acetone and collected by filtration to yield the product, m.p. 341°–343°. Recrystallization from chloroform raises the melting point to 345°–347°.

Anal. Calc'd for $C_{22}H_{26}O_2$:     C, 81.95;   H, 8.13
                           Found: C, 81.71;   H, 8.07 f. Quinone — The product of Step (e) is treated with oxygen in the presence of sodium hydroxide. A suspension of the bisdienone (190 mg) in a solution of methanol (35 ml), water (15 ml), and sodium hydroxide (2.5 g) is stirred for 12 hours at room temperature. The resulting solution is concentrated under reduced pressure, diluted with water (50 ml), and extracted with 20 ml methylene chloride. The blue aqueous layer is extracted again with solvent, and the combined organic extracts are dried and concentrated. The residue is sublimed at 180°–200° (0.1 mm). The orange sublimate is dissolved in chloroform, diluted with petroleum ether, and after standing overnight at −10° the resulting crystalline product (175 mg, 90°) is collected.

g. Hexaene — The product of Step (f) is treated with lithium aluminum hydride and aluminum chloride. To a solution of 7 g of aluminum chloride in 120 ml of ether, 2 g of powdered lithium hydride is added with stirring and the suspension is boiled under reflux for 2 hours. After cooling, a 90 ml portion of the clear supernatant is withdrawn, transferred to a reaction flask and cooled to −80°.

The quinone of step (f) (300 mg) in 10 ml benzene is added to 200 ml of ether and the suspension added dropwise with stirring to the mixed reducing agent at −80° C over a 2 hour period. The suspension is slowly warmed to room temperature and boiled for 0.5 hour. After destroying the excess reagent with ethyl acetate followed by water, and separation of the ether layer, evaporation under reduced pressure yields a green residue which is unstable to light and air.

h. Dihydropyrene — The product of Step (g) is treated with palladium and dehydrogenated. A suspension of 50 mg of 5% palladium-charcoal in 25 ml of benzene containing 1 ml of acetone is refluxed for 15 minutes. To this mixture is added 50 mg of the above green solid and heating is continued for 6 hours. The suspension is cooled, filtered, and the residue remaining after removal of solvent is sublimed at 100°10.1 mm, m.p. 184°–186° C, color change at about 240° C. The product may also be purified through slurrying in methanol and recrystallizing from hexane.

PREPARATION II 15,16-Methylene-1,3,6,8-tetramethyl-15,16-dihydropyrene a. 4,4-Methylene bis(2,6-xylenol) — A solution of 18 g of trioxane in 170 ml of absolute ethanol is added over 165 minutes and under nitrogen to 122 g of 2,6-xylenol in 120 ml of absolute ethanol and 120 ml of hydrochloric acid. The mixture is cooled to −60° C. The solid collected upon filtration is washed with a minimum of cold absolute ethanol and dried to yield the product, m.p. 172.5°–177° C which is further purified through recrystallization to 3:7 ethyl acetate:heptane, m.p. 175°–178° C.

b. 4,4'-Methylene bis-(2,6-dimethylanisole). Dimethyl sulfate (89 g) is added dropwise over 1 hour to 90 g of 4,4'-methylene bis-(2,6-xylenol) and 42.4 g of sodium hydroxide in 425 ml water. Thereafter, 21.2 g of sodium hydroxide and 46 g of dimethyl sulfate are added to the mixture (50±5° C) at hourly intervals, for 7 hours, after which 21.2 g of sodium hydroxide are added. A final charge of 89 g of dimethyl sulfate is added slowly and the mixture then refluxed for 1.5 hours. After cooling to room temperature, the solid is collected and dissolved in a 400 ml, of water. The other extract is washed with 25% sodium hydroxide (2 × 25 ml) and with saturated sodium chloride (2 × 25 ml), then dried overnight Removal of solvent and distillation from sodium affords the product in 75% yield, b.p. 136°–145°10.10 mm, m.p 78°–82° c. 4,4'-Methylene bis(3-chloromethyl-2,6-dimethylanisole) — Hydrogen chloride is bubbled into a stirred mixture of 16.9 g of trioxane, 19.2 g of lithium chloride in 100 ml. of glacial acetic acid. After ten minutes (exothermic from 25° to 38° C) the reaction mixture becomes clear and homogenous. Ten grams of 4,4'-methylene bis(2,6-dimethylanisole) are then added in one portion. The mixture is heated for ½ hour on a steam bath. The reaction slurry is mixed with ice (200 ml) and filtered. The solid is dissolved in chloroform, washed with 10% sodium bicarbonate solution to neutrality and evaporated. Recrystallization of the solid from ethyl acetate affords the product, 73% yield, m.p. 135°–137° C.

d. 4,4'-Methylene-3,3'-(1,2-ethylene)-bis(2,6-dimethylanisole — The compound of step (c) (19.0 g, 0.105 eq. in absolute ether) is condensed upon addition to methyl magnesium iodide (methyl iodide 14.9 g, 0.105 mol; magnesium, 2.50 g, 0.103 mol 300 ml, abs. ether). The bis(chloromethyl) compound is added under prepurified nitrogen over a period of 18 hours. The condensed product is obtained by chromatography on alumina. Elution with petroleum ether affords 6.3 g of product, 55% yield, as a white powder.

Alternatively, 118 g of the same starting material in 2 liters of anhydrous toluene is added over a 68 hour period to a suspension of 60 g of molten sodium and 1 g of tetraphenylethylene in 100 ml of tetrahydrofuran. The sodium is removed by filtration and the filtrate is concentrated to yield the product which is recrystallized from 20% chloroform in isopropanol, m.p. 140°–141.5° C.

e. 4,4'-Methylene-3,3'-(1,2-ethylene)-bis[5,5'-bis(chloromethyl)-2,6-dimethylanisole] — Anhydrous hydrogen chloride is bubbled into a mixture of trioxane (2.4 g) zinc chloride (2.7 g), lithium chloride (1.7 g) and glacial acetic acid (10 ml) to give a homogenous solution of bis chloromethyl ether. 4,4'-Methylene-3,3'-(1,2-ethylene)-bis(2,6-dimethylanisole), alternatively named as 1,3,7,9-tetramethyl-2,6-dimethoxy-5H-dibenzo[a,d]cycloheptene, is added in one portion (3.1 g) and the temperature kept at 50±1° C for 8 hours. The product is isolated by pouring the reaction mixture into ice (20 ml) and extracting with methylene chloride. The extracts are washed twice with 10 ml portions of 10% sodium bicarbonate and twice with 5 ml portions of saturated sodium chloride solution, dried overnight and evaporated. The residue is chromatographed on alumina eluting with ethyl ether/hexane to yield the desired product and 1,3,7,9-tetramethyl-2,8-dimethoxy-4-chromethyl-5H-dibenzo[a,d]cycloheptene.

f. 4,6,12,14-Tetramethyl-5,13-dimethoxy-8,16-methylene-[2.2]-metacyclophane. One gram of 4,4'-methylene-3,3'-(1,2-ethylene)-bis-[5,5'-bis(chloromethyl)-2,6-dimethylanisole] is allowed to react with zinc dust (0.177 g), sodium carbonate (0.260 g) and a catalytic amount of sodium iodide to yield the 4,12-methylene metacyclophane. The hot reaction mixture is poured into ice (100 g) and is extracted with methylene chloride. The extract is washed with water. After the solvent is stripped off, steam distillation provides about an 80% yield of white needles.

Alternatively 5 ml of butyl dichloromethyl ether and 3 ml of stannic chloride are added to 7.1 g of 1,3,7,9-tetramethyl-2,8-dimethoxy-4-chloromethyl-5H-dibenzo[a,d]cycloheptene in 300 ml of dry methylene chloride. After stirring for 24 hours the mixture is poured into 500 ml of water, stirred for 30 minutes and extracted with 500 ml of ether. These extracts are washed with brine, dried over magnesium sulfate and concentrated. The residue is dissolved in 200 ml of heptane, reconcentrated and recrystallized from methylene chloride/heptane to yield 1,3,7,9-tetramethyl-2,8-dimethoxy-4-chloromethyl-5H-dibenzo[a,d]cycloheptene-6-aldehyde, m.p. 205°–206° C. This material (5.83 g) and 3.95 g of triphenylphosphine are added to 175 ml of toluene and heated at reflux for 24 hours. The cooled slurry is filtered and dried to yield 1,3,7,9-tetramethyl-2,8-methoxy-4-triphenylphosphoniummethyl-5H-dibenzo[a,d]cycloheptene-6-aldehyde chloride, m.p. 222°–224° C. To 9.29 g of this material in 300 ml of absolute ethanol is added in a dropwise fashion under nitrogen and with stirring, 30 ml of a solution prepared by dissolving 1.13 g. of sodium in 90 ml of ethanol. The sodium ethoxide is added over a 15 minute period and the mixture is then refluxed for four hours. The cooled mixture is filtered and the filtrate is cooled to −20° C and held there for 15 hours. The solid which forms is collected by filtration and dried to yield 1,3,6,8-tetramethyl-5,13-dimethoxy-8,16-methylene-[2.2]metacycloph-1(2)ene, m.p. 184.5°–186° C. A solution of 635 mg of this material in 100 ml of ethanol is hydrogenated in the presence of 250 mg of 5% palladium-on-charcoal until the theoretical amount of hydrogen is absorbed (about 90 minutes). The mixture is then filtered and concentrated and the residue recrystallized from methanol to yield 1,3,6,8-tetramethyl-5,13-dimethoxy-8,16-methylene-[2.2]metacyclophane, m.p 153°–155° C.

g. Bis dienone — The metacyclophane of step (f) (0.66 g) and anhydrous ferric chloride (2.0 g, 1.2 mol) dissolved in anhydrous chloroform (80 ml) are stirred at room temperature for 6 hours to give an insoluble reddish brown complex. The complex is collected by filtration and is decomposed by vigorously shaking with a mixture of chloroform (70 ml) dilute hydrochloric acid (3 N, 15 ml) until solution was complete. The separate chloroform layer is concentrated and the red-brown solid is dissolved in 70 ml of hot ethanol. The hot solution is treated with charcoal and is concentrated to 15 ml. On cooling yellow needles are deposited in about 90% yield.

h. Quinone — A suspension of the compound of step (g) (0.50 g, 1.63 mol) a water-methanol (70 ml, 150 ml) solution of sodium hydroxide (10 g, 0.25 mol) is stirred for 18 hours at room temperature. The resulting solution is concentrated under a water pump, diluted with water (200 ml) and extracted with methylene chloride (90 ml). The aqueous layer is extracted further (2 × 25 ml) and all extracts were combined, washed with water, evaporated under a water pump and sublimed (100° C/0.01 mm) to give a violet solid. Recrystallization from chloroform-cyclohexane affords orange needles in about 90% yield.

i. 15,16-Methylene-1,3,6,8-tetramethyl-15,16-dihydropyrene — A reducing solution is prepared by adding lithium aluminum hydride (2.0 g) to an ether (120 ml) solution of aluminum chloride (7.0 g) stirring, refluxing the mixture for 2 hours and then transferring 80 ml of cooled supernatant liquid to a preassembled and dried reaction set-up. Dropwise addition of quinone of step (h) (0.340 g dissolved in 10 ml benzene and diluted to 200 ml with dry ether) to the reducing solution mentioned atove at −80° C over 2 hours time yields a mixture of the desired product and a dihydro product. The suspension is warmed to room temperature (1 hour) and then refluxed for ½ hour. The excess reducing agent is decomposed with ethyl acetate and enough water (25 ml) is added to give two phases. The separated ether phase is dried under vacuum. The resulting blue solid is then refluxed in cyclohexane (200 ml) with 30% palladium-on-charcoal (0.300 g) for 18 hours to complete dehydrogenation of the dihydro product. After filtration and removal of the reaction solvent the blue solid is sublimed (140°10.02 mm) to yield the product in about 60% yield.

EXAMPLE I

2-Nitro-1,3,6,8,15,16-hexamethyl-15,16-dihydropyrene

To a stirred solution of 1.0 g of the dihydropyrene of Preparation I in 250 ml of acetic anhydride at 0°, 1.0 g of powdered anhydrous cupric nitrate is added. The color changes over ½ hour from green to purple.

After stirring 2 hours the product is isolated by dilution with 50 g of ice and extracted with 100 ml of ether. Evaporation of the solvent leaves a residue which, after solution in hot methanol and dilution with hot water, deposits the product as dark purple needles. The yield is about 85%.

Further purification can be effected through chromatography on silica gel. Initial elution with 5% methylene chloride/heptane yields the starting material while further elution with 20% methylene chloride heptane yields the desired product, m.p. 224°–226° C.

EXAMPLE II

2-Acetylamino-1,3,6,8,15,16-hexamethyl-15,16-dihydropyrene

To a stirred solution of the 2-nitro-compound of Example I (50 mg) and 0.2 g of sodium acetate in 5 ml of acetic anhydride is added 0.5 g of zinc dust over a period of five minutes. The mixture is stirred for one hour, and water is then added and the mixture is extracted with two 30 ml portions of methylene chloride. The combined extracts are washed with dilute ammonium hydroxide, water, and after drying, the solvent is removed. The residue is chromatographed on an alumina column and the product is eluted with petroleum ether-methylene chloride. The yield is about 90%.

Alternatively the crude residue may be purified by extraction with methylene chloride/ether, evaporation and recrystallization from methylene chloride/heptane.

EXAMPLE III

2-Acetylamino-7-nitro-1,3,6,8,15,16-hexamethyl-15,16-dihydropyrene

The corresponding 2-acetylamino compound of Example II (1.0 g) is dissolved in 250 ml acetic anhydride and stirred at 0°, then 1.0 g of powdered anhydrous cupric nitrate is added portion wise, resulting in a deepening of color towards purple. After stirring for 2 hours the product is isolated by dilution with 50 g of ice and extraction with 100 ml of ether. Evaporation of the solvent leaves a residue which is dissolved in hot methanol and is precipitated with hot water. The yield is about 80%.

EXAMPLE IV 2,7-Dinitro-1,3,6,8,15,16-hexamethyl-15,16-dihydropyrene

2-Amino-7-nitrohexamethyldihydropyrene (prepared from the 2-acetylamino compound of Example III by acid hydrolysis, 0.025 mole) is dissolved in 10-20 ml of fluoboric acid in a 50 ml beaker, and the solution is cooled and stirred in an ice bath. A cold solution is 1.7 g (0.025 mole) sodium nitrite in 4 ml water is added dropwise. After addition the mixture is stirred for 10 minutes and filtered by suction. The solid diazonium fluoborate is washed with 30 ml cold fluoboric acid, then with 95% ethanol and, finally, several times with ether. The product is obtained in about 95% yield.

Twenty grams of sodium nitrate is dissolved in 40 ml of water in a 200 ml beaker and 4 g of copper powder added. To this stirred mixture a suspension of the diazonium fluoborate in 25 ml water is added slowly. Frothing occurs. After addition the product is collected by suction, washed with water, dilute sodium hydroxide and again with water. The product is recrystallized from glacial acetic acid.

Alternatively the dinitro compound is obtained via nitration of the mononitro compound according to the procedure of Example I.

EXAMPLE V 2,7-Diacetylamino-1,2,6,8,15,16-hexamethyl-15,16-dihydropyrene

To a stirred solution of the 2-acetylamino-7-nitro compound of Example III (500 mg) and 2 g of sodium acetate in 50 ml of acetic anhydride is added 5 g of zinc dust over a 10 minute period. The mixture is stirred for 1 hour, water is added, and the mixture is extracted with two 30 ml portions of methylene chloride. The combined extracts are washed with dilute ammonium hydroxide, water, and after drying of solvent over magnesium sulfate, the methylene chloride is removed. The residue is chromatographed on neutral alumina and is eluted with methylene chloride-petroleum ether, affording the product in about 90% yield.

EXAMPLE VI 2,7-Diacetoxy-1,3,6,8,15,16-hexamethyl-15,16-dihydropyrene

Hexamethyldihydropyrene-2,7-quinone (500 mg) is mixed with 50 ml of acetic anhydride and 6 drops of triethylamine at room temperature. To this mixture is added in portions over 5 minutes, 1.0 g of zinc dust. The mixture is stirred for 4 hours and quenched by pouring the dark green mixture into ice and water. The aqueous suspension is stirred until all acetic anhydride has dissolved and is then extracted with methylene chloride/ether. The organic layer is separated, washed, dried, and concentrated, leaving a dark green residue which smelled strongly of acetic acid. The residue is treated with methanol and filtered, washed again with methanol, and dried and recrystallized from methylene chloride/heptane, m.p. 239°–240° C.

Use of other anhydrides, such as propionic anhydride, yields the corresponding acyloxy compounds.

EXAMPLE VII

The 15,16-methylene-1,3,6,8-tetramethyl-15,16-dihydropyrene of Preparation II is treated with acetic anhydride and cupric nitrate by the procedure of Example I; 2-nitro-15,16-methylene-1,3,6,8-tetramethyl-15,16-dihydropyrene is obtained.

2-Nitro-15,16-methylene-1,3,6,8-tetramethyl-15,16-dihydropyrene is treated with sodium acetate, acetic anhydride and zinc dust by the procedure of Example II and 2-acetylamino-15,16-methylene-1,3,6,8-tetramethyl-15,16-dihydropyrene is obtained.

2-Acetylamino-15,16-methylene-15,16-dihydropyrene is treated with acetic anhydride and cupric nitrate according to the procedure of Example II and 2-acetylamino-7-nitro-15,16-methylene-1,3,6,8-tetramethyl-15,16-dihydropyrene is obtained.

2-Amino-7-nitro-15,16-methylene-1,3,6,8-tetramethyl-15,16-dihydropyrene (prepared by hydrolysis of the corresponding 2-acetylamino compound) is treated with fluoboric acid according to the procedure of Example IV. This is then treated with sodium nitrate and 2,7-dinitro-15,16-methylene-1,3,6,8-tetramethyl-15,16-dihydropyrene is obtained.

2,7-Dinitro-15,16-methylene-1,3,6,8-tetramethyl-15,16-dihydropyrene is treated with sodium acetate, acetic anhydride and zinc dust according to the procedure of Example V. 2,7-Diacetylamino-15,16-methylene-1,3,6,8-tetramethyl-15,16-dihydropyrene is obtained.

EXAMPLE VIII

2-Acetyl-1,3,6,8,15,16-hexamethyl-15,16-dihydropyrene

To a solution of 500 mg of 1,3,6,8,15,16-hexamethyl-15,16-dihydropyrene in 25 ml methylene chloride is added dropwise over 45 minutes a solution of 0.17 ml of acetic anhydride and 0.10 ml of stannic chloride in 25 ml of methylene chloride. After 18 hours, the reaction is poured into ice-water and this mixture is stirred until the acetic anhydride has dissolved (2 hours). The aqueous suspension is extracted with methylene chloride/ether and these extracts are washed several times with water, dried, and concentrated. The residue is dissolved in methylene chloride and chromatographed on silica gel. A green band elutes rapidly which is identified as starting material. A second green band which is 2-acetyl-1,3,6,8,15,16-hexamethyl-15,16-dihydropyrene is eluted with methylene chloride, wt. 145 mg (49%), m.p. 202°–203°. Sublimation at 120°–130°10.01 mm raises the melting point to 205°–206°.

Use of excess acetic anhydride (e.g. 0.2 ml with 490 mg of the dihydropyrene starting material) yields 2,7-diacetyl-1,3,6,8,15,16-hexamethyl-15,16-dihydropyrene, m.p. 226°–227° C.

EXAMPLE IX

2-Formyl-1,3,6,8,15,16-hexamethyl-15,16-dihydropyrene 1,3,6,8,15,16stirred 15,16-dihydropyrene (956 mg) is dissolved in 50 ml of dry methylene chloride and to this solution at room temperature are added 0.5 ml of stannic chloride and 1.0 ml of dichloromethylbutyl ether (3 mole equivalents). The dark green solution is stirred at room temperature for 17 hours and poured into water. The aqueous burgundy red suspension is stirred for 15 minutes and extracted with methylene chloride/ether. These extracts are dried and concentrated, and the residue, in methylene chloride is applied to a silica gel column. A dark maroon band is eluted with 3% ethylacetate/methylene chloride. Toward the end of the elution the color changes from burgandy to red-brown, and a second fraction is taken. The main fraction yields 2-formyl-1,3,6,8,15,16-hexamethyl-15,16-dihydropyrene, m.p. 205–207° in about 95% yield, and upon recrystallization from methanol yields black-red needles, m.p. 206°–208°.

EXAMPLE X

2-Acetamido-7-formyl-1,3,6,8,15,16-hexamethyl-15,16-dihydropyrene

To a stirred solution of 400 mg of 2-acetamido-1,3,6,8,15,16-hexamethyl-15,16-dihydropyrene in 25 ml of methylene chloride is added 0.2 ml stannic chloride, followed by 0.4 ml. dichloromethylbutyl ether (two-fold excess). After 3.5 hours, the reaction solution is poured into water. The deep burgundy-red suspension is stirred for 15 minutes and extracted with methylene chloride/ether. These extracts are concentrated, treated with toluene, and reconcentrated to remove traces of acetic acid. After drying in a vacuum oven at 40°, the dark maroon residue is chromatographed on silica gel using 50% ethyl acetate/heptane as eluting solvent to yield 2-acetamido-7-formylhexamethyldihydropyrene. Recrystallization of this material from methylene chloride/heptane yields the product as a dark maroon solid, m.p 216°–218°.

EXAMPLE XI

2-Benzoyl-1,3,6,8,15,16-hexamethyl-15,16-dihydropyrene

To a solution of 400 mg of 1,3,6,8,15,16-hexamethyl-15,16-dihydropyrene in 25 ml of methylene chloride is added successively 0.16 ml of benzoyl chloride and 0.20 ml of stannic chloride. The mixture is stirred for 20 hours, poured into 6N hydrochloric acid and extracted with ether. These extracts are dried, concentrated and chromotographed on silica gel, eluting with 1:1 methylene chloride:hexane to yield, after initial elution of starting material, the desired product which is recrystallized from methylene chloride/methanol, m.p. 221°–223° C.

EXAMPLE XII

1,2,3,6,8,15,16-Heptamethyl-15,16-dihydropyrene

A solution is prepared by carefully adding 6 g of lithium aluminum hydride to a solution of 20 g of aluminum chloride in 250 ml of absolute ether, refluxing the resultant mixture for 2 hours and decanting the cooled clear supernatant. To 50 ml of this supernatant solution is added, in a dropwise fashion over a 30 minute period, 400 mg of 2-formyl-1,3,6,8,15,16-hexamethyl-15,16-dihydropyrene in 20 ml of tetrahydrofuran and 50 ml of ether. The resulting slurry is heated at reflux for 1 hour, cooled and carefully treated with 30 ml of ethyl acetate followed by 30 ml of water. The organic layer is separated, washed with brine, dried, and concentrated to yield the product which is further purified through recrystallization from methylene chloride-heptane, m.p. 214°–215° C.

By substituting 2,7-diacetyl-1,3,6,8,15,16-hexamethyl-15,16-dihydropyrene in the foregoing procedure, there is obtained 2,7-diethyl-1,3,6,8,15,16-hexamethyl-15,16-dihydropyrene.

EXAMPLE XIII

2-Hydroxymethyl-1,3,6,8,15,16-hexamethyl-15,16-dihydropyrene

To a mixture of 400 mg of lithium aluminum hydride in 75 ml of absolute ether is added over a 45 minute period a solution of 300 mg of 2-formyl-1,3,6,8,15,16-hexamethyl-15,16-dihydropyrene in 50 ml of tetrahydrofuran. Upon completion of the addition, 30 ml of ethyl acetate are added, followed by 30 ml of water. The organic layer is separated, washed with brine, dried, and concentrated to yield the product which is recrystallized from methylene chloride-heptane, m.p. 210°–212° C.

EXAMPLE XIV

2-Acetoxymethyl-1,3,6,8,15,16-hexamethyl-15,16-dihydropyrene

One gram of 2-hydroxymethyl-1,3,6,8,15,16-hexamethyl-15,16-dihydropyrene, 5 ml of acetic anhydride and 2.5 ml of pyridine is allowed to stand for 15 hours. At the end of this time, the mixture is poured into ice water and extracted with methylene chloride. These extracts are washed with water, dried, and evaporated to yield 2-acetoxymethyl-1,3,6,8,15,16-hexamethyl-15,16-dihydropyrene, which may be further purified through recrystallization from methylene chloride-heptane.

EXAMPLE XV

2-Cyano-1,3,6,8,15,16-hexamethyl-15,16-dihydropyrene

To a slurry of 257 mg of 2-formyl-1,3,6,8,15,16-hexamethyl-15,16-dihydropyrene in 60 ml of ethanol is added a solution of 106 mg of hydroxylamine hydrochloride in 5 ml of water which has been previously neutralized with sodium carbonate to pH 7–8. This mixture is heated at reflux for 15 minutes and water is then added until crystallization begins. After cooling the mixture in an ice bath, the solid is collected by filtration and dried to yield 2-isonitrosomethyl-1,3,6,8,15,16-hexamethyl-15,16-dihydropyrene, m.p. 206°–208°.

A mixture of 244 mg of this oxime and 20 ml of acetic anhydride is heated at reflux for 15 minutes and then poured into water. This mixture is stirred until the acetic anhydride is dissolved and then extracted with methylene chloride-ether. The extracts are washed with brine, dried, and evaporated. The residue is dissolved in toluene and chromatographed on silica gel, eluting with 1:1 methylene chloride:heptane to yield the product as the initial band, m.p. 218°–219° C.

By employing 2-acetyl-1,3,6,8,15,16-hexamethyl-15,16-dihydropyrene, there is similarly obtained 2-($\alpha$-isonitrosoethyl)-1,3,6,8,15,16-hexamethyl-15,16-dihydropropane which is converted to 2-cyano-1,3,6,8,15,16-hexamethyl-15,16-dihydropyrene.

EXAMPLE XVI

The following formulation is prepared:

| | |
|---|---|
| Geon 103-EP polyvinyl resin | 100.0 g |
| Advastate T 3 stabilizer | 2.0 g |
| Stearic acid | 0.5 g |
| 2-Acetamide-nitro-1,3,6,8,15,16-hexamethyl-15,16-dihydropyrene | 0.005 g |

The dihydropyrene is solvent blended (methylene chloride) with the powdered poly(vinyl chloride) and other additives and the solvent is evaporated. The batch is milled on a two-roll plastics mill for 5 minutes at 350° F. The milled sheet is compression molded at 365° F. into four 5×5×0.045 inch sheets in a picture frame mold. (Molding cycle: 5 minutes at contact pressure; 45 seconds at 5 tons; 45 seconds at 10 tons; 45 seconds at 15 tons; 45 seconds at 20 tons; then flash quench in cold water.) The colored plastic films clear on exposure to light and darken when left in the dark.

What is claimed is:

1. A compound 2-acetoxymethyl-1,3,6,8,15,16-hexamethyl-15,16-dihydropyrene.

2. A compound 2,7-diacetoxy-1,3,6,8,15,16-hexamethyl-15,16-dihydropyrene.

* * * * *

UNITED STATES PATENT AND TRADEMARK OFFICE
CERTIFICATE OF CORRECTION

PATENT NO. : 3,697,585
DATED : October 10, 1972
INVENTOR(S) : Luther A. R. Hall, et al It is certified that error appears in the above-identified patent and that said Letters Patent are hereby corrected as shown below:

Column 3, line 20, "-[d2.2]" should read -- -[2.2] --.

Column 3, line 62, in the formula, "2. $(CH_3)_2SO_4/OH$" should read -- 2. $(CH_3)_2SO_4/OH^-$ --, and "$ZnCl_2/LlCl$" should read -- $ZnCl_2/L_ilCl$ --.

Column 8, line 22, "100°10.1" should read -- 100°/0.1 --.

Column 8, line 57, "136°-145°10.10 mm," should read -- 136°-145°/0.10 mm, --.

Column 11, line 8, "140°10.02" shoud read -- 140°/0.02 --.

Column 13, line 52, "120°-130°10.01 mm" should read --120°-130°/0.01 mm --.

Column 13, line 63, "1,3,6,8,15,16 stirred 15,16-" should read -- 1,3,6,8,15,16-hexamethyl-15,16- --.

UNITED STATES PATENT OFFICE
CERTIFICATE OF CORRECTION

Patent No. 3,697,585          Dated October 10, 1972

Inventor(s) Luther A. R. Hall et al

It is certified that error appears in the above-identified patent and that said Letters Patent are hereby corrected as shown below:

Column 16, line 28, "2-Acetamide-notro" should read
-- 2-Acetamido-7-nitro --.

Signed and Sealed this

Twentieth Day of September 1977

[SEAL]

Attest:

RUTH C. MASON
*Attesting Officer*

LUTRELLE F. PARKER
*Acting Commissioner of Patents and Trademarks*